United States Patent Office 3,423,131
Patented Jan. 21, 1969

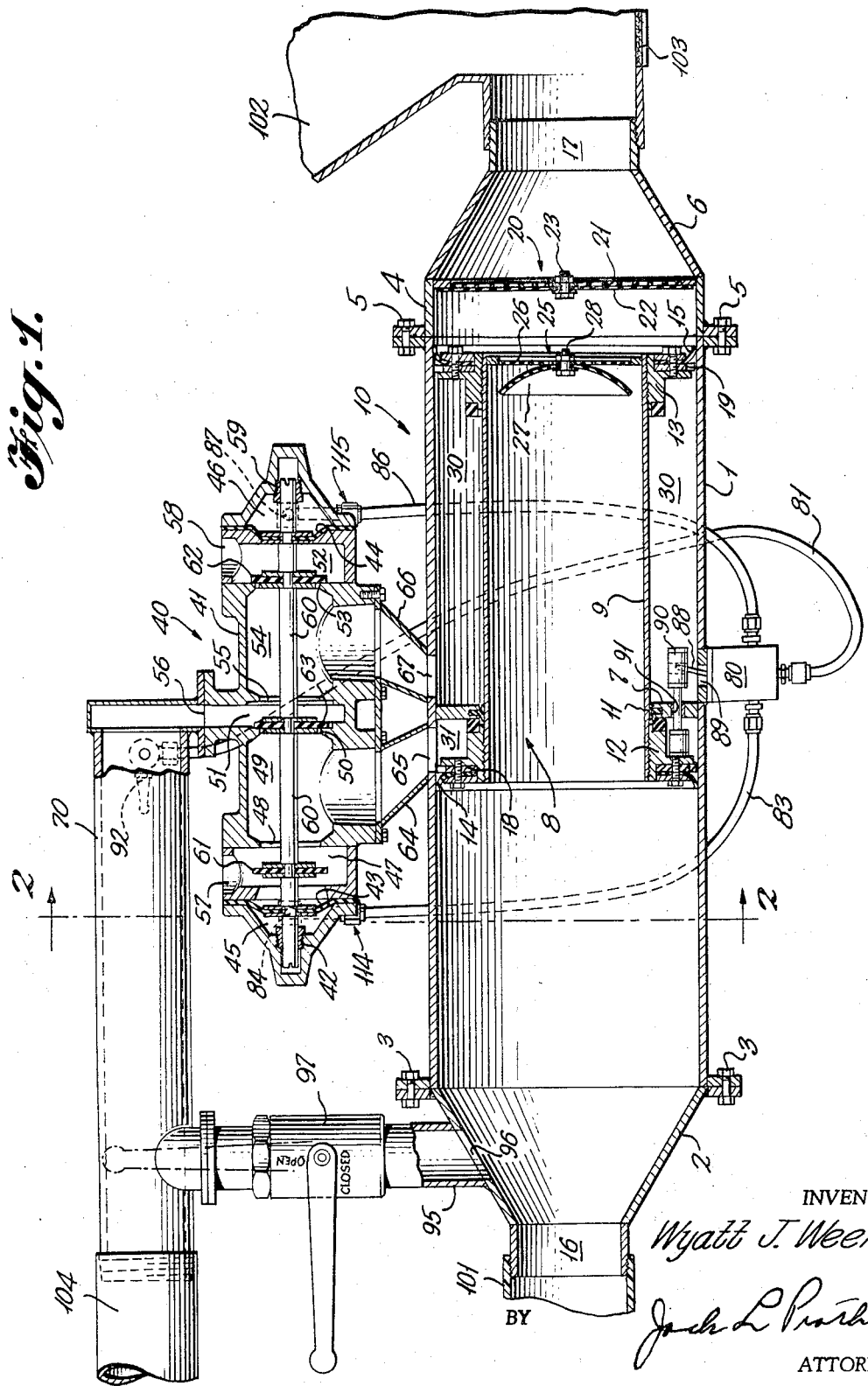

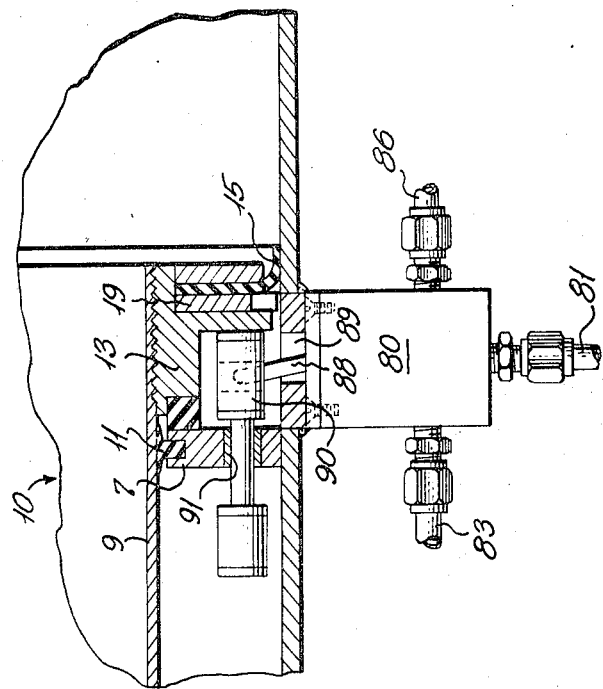
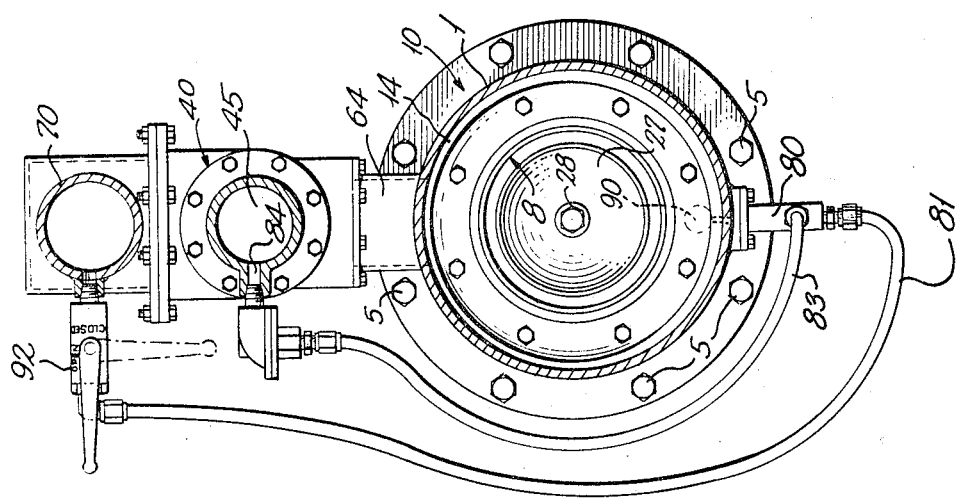

3,423,131
LINE CHARGING AND PNEUMATIC
CONVEYING APPARATUS
Wyatt J. Weeks, P.O. Box 7947,
Houston, Tex. 77007
Continuation-in-part of application Ser. No. 613,241,
Feb. 6, 1967. This application Nov. 24, 1967, Ser.
No. 685,650
U.S. Cl. 302—36   8 Claims
Int. Cl. B65g 53/40; F04b 17/00

ABSTRACT OF THE DISCLOSURE

A line charging and pneumatic conveying apparatus having a hollow cylindrical housing with a material inlet and a gas material outlet. A hollow reciprocating spoolpiece extends through a divider ring on the inside of the housing. A four way valve is connected to the housing and supplies elevated pressure gas alternately to a pressure chamber on either side of the divider ring for reciprocating the spoolpiece. Motion of the spoolpiece creates a lower pressure zone at the material inlet for the charging of material into the housing. The rims of the spoolpiece are constructed to allow the elevated pressure gas to escape and convey material from the inlet end of the housing.

Background of the invention

This invention relates to a pneumatic conveying and line charging apparatus particularly for use in the positive displacement of a flowable material in a compressible state, from a material source into a conveying line and pneumatically conveying the material to its destination. The material source is an open type storage such as a material vessel or open pile of material. The material vessel may be of the self unloading type such as by gravity feed and may employ an aeration pad for fluidizing the material to assist in its discharge from the vessel. Apparatus of the general type are particularly useful in the unloading of material such as Portland Cement or flour from railroad hopper cars either the aerated or unaerated type. It is also used for unloading stationary storage vessels of the nonpressure type.

In the past it was generally required that material in a compressible state be introduced into a conveying line from a pressurized tank or from a gravity feed tank through a rotary lock feeder or screw conveying feeder. Another known method is the use of a vacuum conveying system in which the material is drawn from the material source and through the conveying line. This arrangement requires a special discharge filter for separating the conveyed material from the conveying media.

Pumping apparatus of a similar nature have been employed for transporting incompressible fluids; however, these have not proven successful for conveying of material in a pneumatic system where the material mixes with the conveying gas and takes on the characteristic of a compressible fluid.

One known type of apparatus which has been used for the pumping of a substantially noncompressible material is disclosed in U.S. Patent No. 1,558,609. This apparatus was designed for use in pumping a sludge material which obviously has a high moisture content and is therefore substantially noncompressible. This apparatus is not designed to operate in a pneumatic conveying system, but rather as a positive displacement pump and conveying means which receives the material into one end and mechanically forces the material through the apparatus and hence through the conveying line.

The disclosed apparatus completely isolates the operating media, steam, from the conveyed material. The steam merely acts on the piston to provided a moving force thereto without further use of the steam in the material conveying.

Summary of the invention

This invention comprises an apparatus for conveying a flowable material in a gaseous medium.

It is a primary object of this invention to provide an apparatus which will charge a conveying line with a flowable material from a nonpressure type material source and also provide the gaseous conveying medium for conveying the material charged into the line.

It is also an object of the invention to provide an apparatus capable of performing the aforementioned function which is simple in construction, inexpensive to manufacture, and which is capable of high performance at low operating costs.

The apparatus comprises a hollow casing forming a housing. A divider ring is mounted on the inside of the casing and a hollow reciprocating spoolpiece extends through the seal ring in spaced relation to the interior wall of the casing. The spoolpiece has a flexible rim portion on each end thereof in sliding contact with the interior wall of the casing thus forming a pressure chamber on each side of the divider ring. The inlet end of the casing has a check valve assembly mounted therein which closes the inlet end of the casing in response to back pressure downstream of the check valve. A second check valve assembly is mounted in the upstream end of the spoolpiece and is operable to close the upstream end of the spoolpiece in response to back pressure on the downstream side of this check-valve.

A four way valve assembly is connected to a gas supply manifold which receives elevated pressure gas from a main gas supply conduit. The four way valve assembly is mounted on the casing and alternately delivers elevated pressure gas to the chambers on either side of the divider ring in response to a pilot valve operatively associated with the spoolpiece.

Elevated pressure gas alternately entering the chambers on each side of the divider ring acts on the rim portion of the spoolpiece to continuously reciprocate the spoolpiece within the casing. The reciprocating movement of the spoolpiece creates a reduced pressure zone intermediate the first and second check valves which allows material to pass through the first check valve and into the reduced pressure zone. Gas escaping around the flexible rim portion on the upstream end of the spoolpiece entrains the material in the reduced pressure zone and pneumatically conveys the material through the apparatus and out through a conveying line connected to the discharge end of the apparatus. Gas escaping around the flexible rim portion on the downstream end of the spoolpiece maintains steady flow conditions in the conveying line.

Regulating means are provided for controlling the amount of elevated pressure gas entering the chambers on each side of the divider ring and thereby regulate the material feed rate to the conveying system.

Brief description of the drawings

FIG. 1 is a longitudinal sectional view of the apparatus;

FIG. 2 is an elevated end view of the apparatus of FIG. 1; and

FIG. 3 is a fragmentary sectional view illustrating the alternate actuation of the pilot valve shown in FIG. 1.

Description of the preferred embodiments

The preferred embodiment of the apparatus comprises a housing 10 consisting of a cylindrical casing 1 having a first hollow conical section 2 connected at the discharge end thereof by suitable connecting means such as bolts 3. At the inlet end of the housing, a second cylindrical section 4 is connected to the cylindrical casing 1 with suitable connections such as bolts 5. A second hollow conical section 6 is connected to the second cylindrical section 4. The first conical section 2 has a material discharge port 16 in its downstream end and the second conical section 6 has a material inlet port 17 in its upstream end. The material discharge port 16 communicates with a conveying line 101 which delivers the material to its ultimate destination. The material inlet port 17 receives material from a suitable material source such as a hopper 102. If required, the hopper 102 may have an aeration pad 103 in its lower region for fluidizing the material to assist the material to flow through the inlet port 17. It is to be understood, however, that the material source could comprise merely an exposed quantity of material.

A rigid sealing divider ring 7 is connected around the interior of the cylinder casing 1 at approximately the midpoint thereof. This ring is connected to the interior surface of the cylindrical casing by welding or other suitable means in such a manner as to provide a substantially airtight connection between the divider ring 7 and the wall of the cylindrical casing 1.

A spoolpiece 8 is movably mounted on the inside of the cylindrical casing 1. The spoolpiece 8 consists of a cylindrical tube 9 which extends through the divider ring 7; the outer surface of the tube is in sealing contact with a ring seal 11 mounted on the inside edge of divider ring 7. The divider ring 7 maintains the tube 9 in spaced relation with respect to the interior walls of the cylindrical casing 1.

Flanges 12 and 13 are connected around the outside periphery at each end of the cylindrical tube 9 one on each side of the dividing ring 7. The flanges 12 and 13 extend outwardly from the tube 9 toward the interior wall of the cylindrical casing 1; however, the flanges do not come into contact with the interior wall. Flexible sliding washers 14 and 15 are connected to the flanges 12 and 13, respectively. These washers 14 and 15 are made of a suitable flexible material as for example nylon reinforced neoprene. The sliding washers 14 and 15 extend outwardly from the flanges 12 and 13 into sealing engagement with the interior wall of the cylindrical casing 1. In the preferred embodiment, the sliding washers 14 and 15 are of such a size in their outward extension that they are bent along the interior wall of the cylindrical casing 1. If required, guide rings 18 and 19 may be connected to the flanges 12 and 13, respectively. The guide rings 18 and 19 are provided with serrated edges for maintaining limited contact with the interior wall of casing 1 for guide purposes while still permitting free flow of gas therethrough. The assembly of flanges 12 and 13 and the washers 14 and 15 and guide rings 18 and 19 may be collectively referred to as the spoolpiece rims.

On the intake end of the housing 10 near the juncture of the conical section 6 and the cylindrical section 4, a first check valve assembly 20 is mounted within the housing 10. This check valve assembly 20 consists of a rigid perforated disc 21 connected around its circumference to the interior wall of the cylindrical section 4 with a flexible disc 22 mounted on the downstream side thereof. The flexible disc 22 is connected through its center to the center of the rigid perforated disc 21 by a suitable fastening means such as the nut and bolt assembly 23.

A second check valve assembly 25 is mounted on the interior of the cylindrical tube 9 adjacent its upstream end. This second check valve assembly consists of a rigid perforated disc 26 connected around its circumference to the interior wall of the cylindrical tube 9 with a flexible disc 27 mounted on the downstream side thereof. The flexible disc 27 is connected through its center to the center of the rigid perforated disc 26 by a suitable fastening means such as the nut and bolt assembly 28. As depicted in FIG. 1, the flexible disc 27 is flexed away from the rigid disc 26 due to a flow of gas through the check valve assembly 25.

As can be seen with reference to FIG. 1, the spoolpiece 8 and the seal ring 7 form within the cylindrical casing 1 a discharge pressure chamber 30 and an intake pressure chamber 31.

Mounted on the exterior of the housing 10 is a four-way valve 40. The valve consists of a closed housing 41 made up of a plurality of sections connected together and having a shaft 60 movably mounted on the inside thereof. The housing is separated at each end thereof by an impervious flexible diaphragm seals 43 and 44 into a first pressure chamber 45 and a second pressure chamber 46. Adjacent the first pressure chamber 45 is provided a first gas exhaust compartment 47 having a gas exhaust port 57 therein. The first gas exhaust compartment 47 communicates via a port 48 with a first gas inlet compartment 49 which in turn communicates via a port 50 with a gas supply chamber 51. Adjacent the second pressure chamber 46 is provided a second gas exhaust compartment 52 having a gas exhaust port 58 therein. The second gas exhaust compartment communicates via a port 53 with a second gas inlet compartment 54 which in turn communicates via a port 55 with the gas supply chamber 51. The gas supply chamber 51 communicates via a port 56 with a gas supply manifold 70. The gas supply manifold 70 receives elevated pressure gas from a main gas supply conduit 104.

The shaft 60 extends from the first pressure chamber 45, through the flexible diaphragm seal 43, hence through the first gas exhaust compartment 47, the port 48, the first gas inlet compartment 49, port 50, gas supply chamber 51, port 55, gas inlet compartment 54, port 53, second gas exhaust compartment 52 and through the flexible diaphragm seal 44 and into the second pressure chamber 46. Within the section of housing 41 which encloses the first and second gas pressure chambers 45 and 46, respectively, is provided suitable guide means 42 and 59 for receiving the ends of the shaft 60, and which enables the shaft to be moved back and forth in an axial direction.

The flexible diaphragm seals 43 and 44 are sealably connected to the shaft 60 so that any flexing of the respective diaphragms will impart an axial movement to the shaft 60.

A first rigid seal disc 61 is disposed within the gas exhaust compartment 47 and fixedly connected through its center to the shaft 60. The disc 61 is positioned to close the port 48 when the shaft 60 is moved in an axial direction to the right, as viewed in FIG. 1. A similar second rigid seal disc 62 is disposed in the second gas exhaust compartment 52 and fixedly connected to the shaft 60 to close port 53 when the shaft 60 is moved axially to the left.

A third seal disc 63 is disposed within the gas supply chamber 51 and connected through its center to the shaft 60. The disc 63 is positioned to close the port 55 when the shaft 60 moves axially to the right and to close port 50 when the shaft 60 moves axially to the left.

The first gas inlet compartment 49 is in communication with the intake pressure chamber 31 via a conduit 64 connected to a port 65 in the wall of the casing 1 adjacent the divider ring 7. The second gas inlet compartment 54 is in communication with the discharge pressure chamber 30 via a conduit 66 connected to a port 67 in the wall of the casing 1 adjacent the divider ring 7.

A pilot valve 80 is mounted on the cylindrical casing 1. This valve 80 is connected via a conduit 81 to the gas supply manifold chamber 45 via a second conduit 83, quick exhaust valve 114 and port 84 in the wall of the chamber 45. Valve 80 communicates with the second pressure chamber 46 via a third conduit 86, quick exhaust valve 115 and port 87 in the wall of the second pressure chamber 46.

The pilot valve 80 is operated by a toggle lever 88 which extends into the discharge pressure chamber 30 through an opening 89 in the wall of the cylindrical casing 1. The pilot valve 80 is sealably mounted over the opening 89 to prevent gas from escaping from the discharge pressure chamber 30. It is, of course, to be understood that the lever 88 could extend into the intake pressure chamber 31 and achieve the same results.

The toggle lever 88 operates the pilot valve 80 to direct the flow of gas alternately to the conduits 83 and 86.

The toggle lever engages at its one end with the rod member 90 which extends through a sleeve bearing 91 mounted in the divider ring 7. The rod member 90 is mounted for axial movement through the bearing 91. The rod member 90 is positioned to be engaged by the flange 12 and moved axially to the right when the spoolpiece 8 is in its extreme position to the right. This will in turn move the toggle lever 88 to the right thereby stopping the flow of gas into conduit 86 and directing the flow of gas into the conduit 83. When the spoolpiece 8 is moved to its extreme position to the left, the flange 13 engages the rod 90 moving it axially to the left. This in turn moves the toggle lever to the left which stops the flow of gas into conduit 83 and directs the flow of gas again into conduit 86. Many other arrangements can be devised for switching the flow of gas through the pilot valve in response to changes in the position of the spoolpiece without departing from the scope of the invention.

A control valve 92 is mounted in the conduit 81 for completely stopping the flow of gas to the pilot valve. This control valve is the main control for the apparatus as will become apparent from the following description.

A conduit 95 may be connected from the gas supply manifold 70 to the downstream side of the housing through a port 96. Regulating valve 97 is mounted in the conduit 95. This arrangement can be used for purging the conveying line 101 of any material after the line charging and pneumatic conveying apparatus is shut off; additionally, however, this arrangement is used during the conveying operation to regulate the material feed rate in a manner to be described hereinafter.

The apparatus is operated by alternately switching the flow of gas from the discharge pressure chamber 30 to intake pressure chamber 31. This is accomplished by means of the four way valve 40.

Elevated pressure gas entering the pilot valve 80 via conduit 81 is directed by the pilot valve 80 into conduit 86 and hence into the second pressure chamber 46. This elevated pressure gas causes the flexible pressure diaphragm seal 44 to move the shaft 60 to the left. This movement of the shaft 60 moves the seal discs 61, 62 and 63 to the left. Seal disc 61 opens port 48 to allow gas to exhaust from the intake pressure chamber 31 through port 65 via conduit 64 to the first gas inlet compartment 49 and hence through port 48 into gas exhaust compartment 47 and then through port 57 to atmosphere. The disc 63 closes port 50, opens port 55 allowing elevated pressure gas entering the gas supply chamber 51 from the gas supply manifold 70 to pass through port 55 into the second gas inlet compartment 54 thence via conduit 66 and through port 67 into the discharge pressure chamber 30. At the same time, disc 62 closes port 53 to prevent gas escaping into the second gas exhaust compartment 52.

The elevated pressure gas entering discharge pressure chamber 30 acts on the face of the rim of the spoolpiece to move the spoolpiece 8 to the right. This movement to the right is termed the discharge stroke of the spoolpiece. The flexible sliding seal member 15 allows a significant amount of the elevated pressure gas to escape around the seal member 15 and flow through the perforated disc 26 and around the flexible disc 27 and then through the hollow spoolpiece and out through the discharge port 16 and through the conveying line 101.

While the gas escaping around the flexible sliding seal 15 is a substantial quantity, the pressure drop around the sliding seal 15 is sufficient to provide a force on the rim of the spoolpiece moving the spoolpiece to the right.

The escaping gas acts as a gas bearing for the flexible sliding seal 15 thus reducing friction wear on the seal 15 and more importantly provides conveying gas to move material through the system.

Once the spoolpiece 8 has moved to the extreme right completing its discharge stroke, the flange 12 engages the rod 90 moving it to the right thus moving the toggle lever 88 to the right. This movement of the toggle lever 88 stops the flow of gas to the conduit 86 and directs the flow to the conduit 83. The elevated pressure gas enters the first pressure chamber 45 through the port 84 causing the diaphragm seal 43 to move the shaft 60 to the right. Movement of the shaft 60 to the right moves the discs 61, 62 and 63 to the right which in turn directs the flow of elevated pressure gas from the gas supply manifold 70 into the first gas inlet compartment 49 and thence into the intake pressure chamber 31. Gas is exhausted from the discharge pressure chamber 30 in a manner previously described with reference to exhausting from intake pressure chamber 31.

Elevated pressure gas entering the intake pressure chamber 31 acts on the rim of the spoolpiece forcing the spoolpiece 8 to the left. This movement to the left is termed the intake stroke of the spoolpiece. A substantial portion of the elevated pressure gas escapes around the flexible sliding seal 14 serving the same purpose as previously described with reference to the escape around flexible sliding seal 15.

The alternating action of the gas and resulting movement of the spoolpiece continues until the flow of gas to pilot valve 80 is cut off by the control switch 92.

Now that the operation of the apparatus has been described, it will become apparent how the apparatus operates to pneumatically convey a flowable material.

A flowable material enters the inlet port 17 from a material source such as a storage vessel 102. The material may be fluidized at the point of entry into inlet port 17 by means of an aeration pad 103. As the spoolpiece moves to the left during the intake stroke, a reduced pressure zone 105 is created on the upstream side of the spoolpiece. This reduced pressure zone allows material to flow through the check valve assembly 20. As the spoolpiece moves to the right on the discharge stroke, the gas escaping around the sliding seal 15 will entrain the material which has passed through check valve 20 and convey the material through the check valve assembly 25 and on through the hollow spoolpiece and out through the outlet port 16 and into conveying line 101. It can be seen that flexible disc 22 will close against the perforated disc 21 to prevent back flow through the check valve 20 when the spoolpiece is moving to the right during the discharge stroke. Likewise, as the spoolpiece 8 moves to the left during the intake stroke the back pressure inside the spoolpiece causes the flexible disc 27 to close against the perforated disc 26 thus creating the reduced pressure zone 105 on the upstream side of the spoolpiece 8.

Once the spoolpiece starts its intake stroke to the left, the gas escaping around the sliding seal 14 will continue to convey the entrained material through the conveying line.

The regulating valve 97 is used during the charging and pneumatic conveying operation to regulate the material feed rate to the conveying system. This is accomplished by diverting a portion of the gas in the gas supply manifold 70 through the conduit 95 and directly to the conveying line 101 thus limiting the amount of gas passing through the apparatus via ports 65 and 67 and thereby controlling the frequency of operation of the reciprocating spoolpiece 8. Since each cycle of the spoolpiece 8 charges a given volume of material into the conveying system, the material feed rate is thereby regulated.

Obviously, numerous modifications and variations of the present invention are possible in light of the above

I claim:

1. A line charging and pneumatic conveying apparatus compirsing a housing having a material inlet and a gas material outlet, a divider seal member connected around the interior of said housing intermediate the material inlet and gas material outlet, a hollow reciprocating element slidably extending through an opening in the divider seal member, said reciprocating element having outwardly extending rim portions around each end thereof, said rim portions extending into sliding engagement with the interior of said housing and forming a pressure chamber on each side of said divider seal member, means for alternately supplying elevated pressure gas to each of said pressure chambers for reciprocating the reciprocating element, said rim portions including means for allowing the elevated pressure gas to escape from the respective pressure chambers, in an amount sufficient to pneumatically convey material.

2. The apparatus of claim 1 wherein a check valve assembly is mounted in the interior of said reciprocating element.

3. The apparatus of claim 2 wherein an additional check valve assembly is mounted in said housing adjacent the material inlet.

4. The apparatus of claim 3 wherein the gas escape means comprises a flexible seal member extending into engagement with the interior wall of the casing.

5. The apparatus of claim 4 wherein the housing comprises an elongated cylindrical casing having a conical section and said reciprocating element consists of a cylindrical spoolpiece with rim portions comprised of a rigid ring flange with a plastic washer connected thereto.

6. The apparatus of claim 5 wherein the means for alternately supplying gas includes a pilot valve having a toggle lever extending into the interior of the casing, said lever being actuated by each stroke of the spoolpiece for alternating the flow of gas to the pressure chambers.

7. The apparatus of claim 4 including means for regulating the material feed rate through the material inlet.

8. The apparatus of claim 7 wherein a gas supply header communicates with the alternating gas supply means and said material feed regulating means comprises a conduit having a regulating valve therein, said conduit providing gas communication between the gas supply header and gas material outlet.

References Cited

UNITED STATES PATENTS

| 1,558,609 | 10/1925 | Hill | 103—51 |
|---|---|---|---|
| 1,595,362 | 8/1926 | Schaefer | 302—36 |
| 2,667,280 | 1/1954 | Lane et al. | 302—51 |

ANDRES H. NIELSEN, *Primary Examiner.*

U.S. Cl. X.R.

91—329; 103—51; 303—53

UNITED STATES PATENT OFFICE
CERTIFICATE OF CORRECTION

Patent No. 3,423,131                      January 21, 1969

Wyatt J. Weeks

It is certified that error appears in the above identified patent and that said Letters Patent are hereby corrected as shown below:

In the heading to the printed specification, lines 6 and 7, cancel "Continuation-in-part of application Ser. No. 613,241, Feb. 6, 1967."

Signed and sealed this 14th day of April 1970.

(SEAL)
Attest:

Edward M. Fletcher, Jr.                      WILLIAM E. SCHUYLER, JR.

Attesting Officer                             Commissioner of Patents